(12) United States Patent
Oura et al.

(10) Patent No.: US 7,505,065 B2
(45) Date of Patent: Mar. 17, 2009

(54) IMAGE PICKUP SYSTEM, CAMERA, EXTERNAL APPARATUS, IMAGE PICKUP PROGRAM, RECORDING MEDIUM, AND IMAGE PICKUP METHOD

(75) Inventors: Koutatsu Oura, Shanghai (CN); Ko Yokokawa, Tokyo (JP); Hiroto Nishiyama, Tokyo (JP)

(73) Assignee: Olympus Corporation, Tokyo (JP)

( * ) Notice: Subject to any disclaimer, the term of this patent is extended or adjusted under 35 U.S.C. 154(b) by 691 days.

(21) Appl. No.: 10/725,230

(22) Filed: Dec. 1, 2003

(65) Prior Publication Data
US 2004/0223057 A1 Nov. 11, 2004

(30) Foreign Application Priority Data
Jan. 6, 2003 (JP) .............................. 2003-000618

(51) Int. Cl.
*H04N 5/225* (2006.01)
(52) U.S. Cl. ............................... 348/207.1; 348/211.99
(58) Field of Classification Search ............ 348/207.99, 348/207.1, 207.11, 211.99, 211.4, 211.7, 348/211.8, 211.5, 211.6, 211.1
See application file for complete search history.

(56) References Cited

U.S. PATENT DOCUMENTS

| | | | | |
|---|---|---|---|---|
| 6,556,241 B1 * | 4/2003 | Yoshimura et al. | ..... | 348/211.99 |
| 6,677,990 B1 * | 1/2004 | Kawahara | .............. | 348/211.13 |
| 6,819,355 B1 * | 11/2004 | Niikawa | ................. | 348/207.11 |
| 6,835,008 B2 * | 12/2004 | Iida | .............................. | 396/448 |
| 6,975,350 B1 * | 12/2005 | Mohammed et al. | ... | 348/207.11 |
| 6,977,672 B1 * | 12/2005 | Okuno | ................... | 348/207.11 |
| 6,980,233 B1 * | 12/2005 | Hirasawa | ................. | 348/207.1 |
| 7,012,636 B2 * | 3/2006 | Hatanaka | ............... | 348/211.99 |
| 7,098,943 B2 * | 8/2006 | Shibutani | ................. | 348/211.1 |

FOREIGN PATENT DOCUMENTS

JP 138860 5/2000

* cited by examiner

*Primary Examiner*—Nhan T. Tran
*Assistant Examiner*—Amy Hsu
(74) *Attorney, Agent, or Firm*—Volpe and Koenig, P.C.

(57) ABSTRACT

An image pickup system including a digital camera and a personal computer (PC) connected to each other. The camera includes a camera control unit for controlling picture-taking based on photographing conditions set either by the camera or the PC, and a communication unit for communicating with the PC. The PC includes: a display for displaying the photographing condition and an image, a mouse and the like capable of setting the photographing condition through the operation on a screen, a communication unit for communicating with the camera, a capture-mode start/termination unit for selecting between a first photographing mode in which the camera serves as a master and a second photographing mode in which the PC serves as the master, and a control unit for setting the second photographing mode just after the start of control of the PC for: reading photographing information of the camera, and after that, setting either the first photographing mode or the second photographing mode in accordance with the selection.

2 Claims, 5 Drawing Sheets

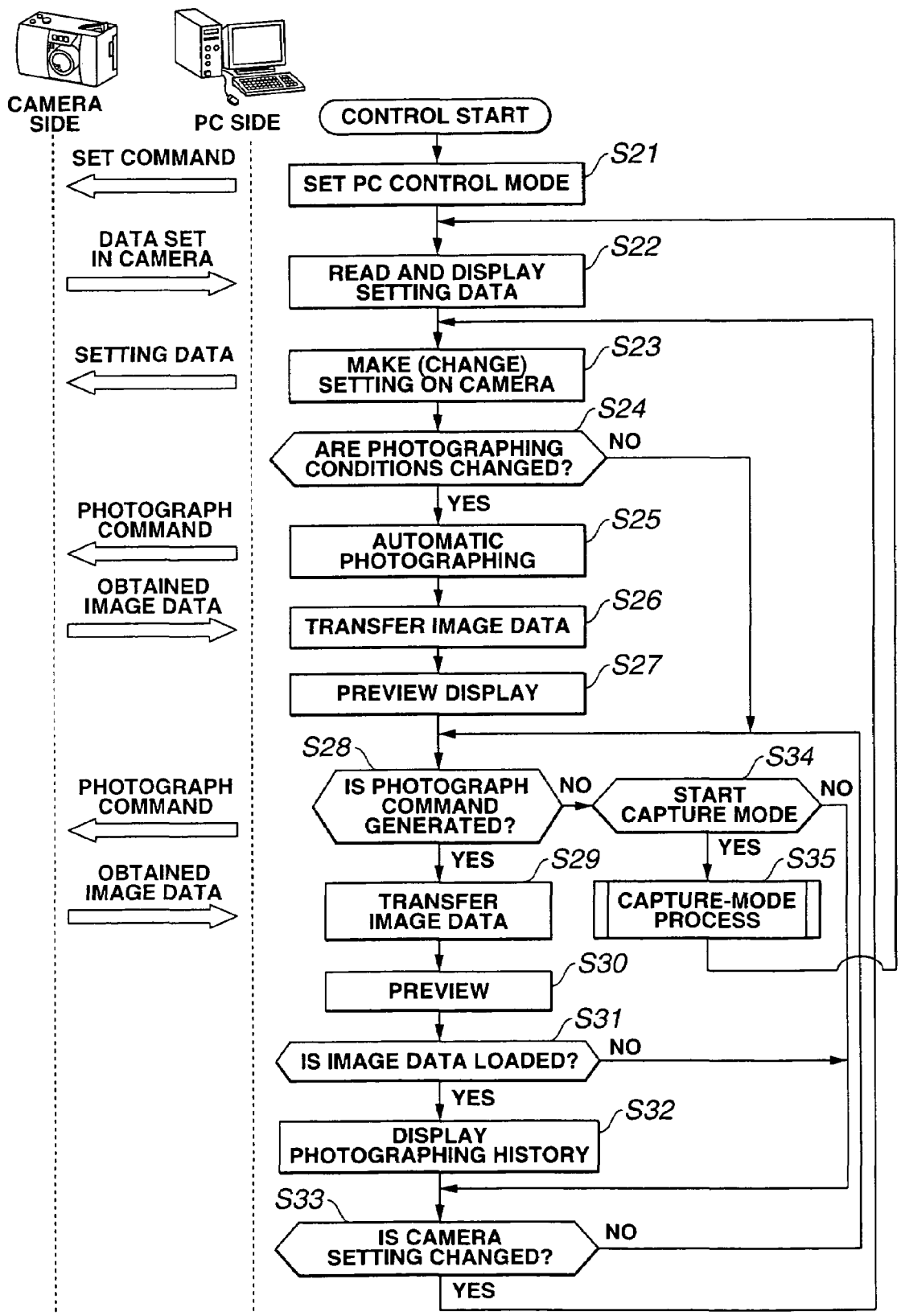

FIG.4B         FIG.4A
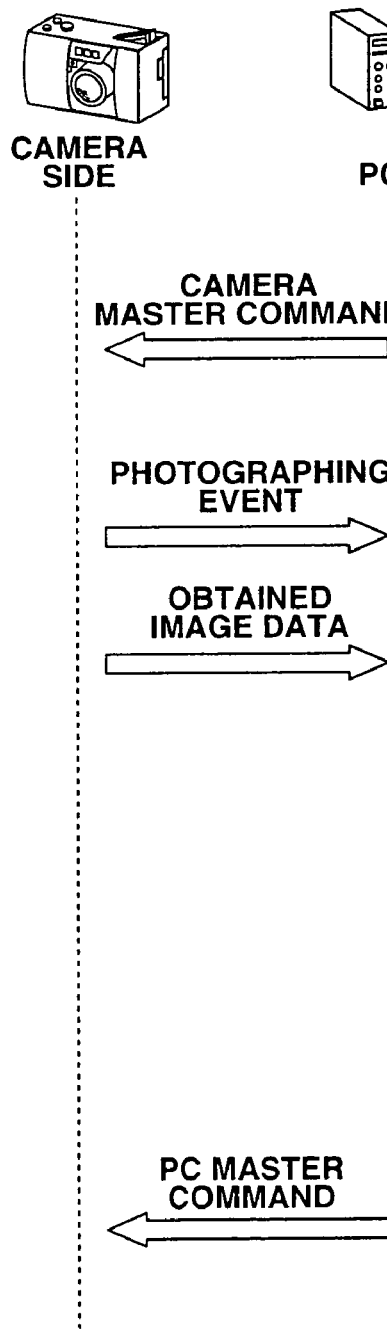
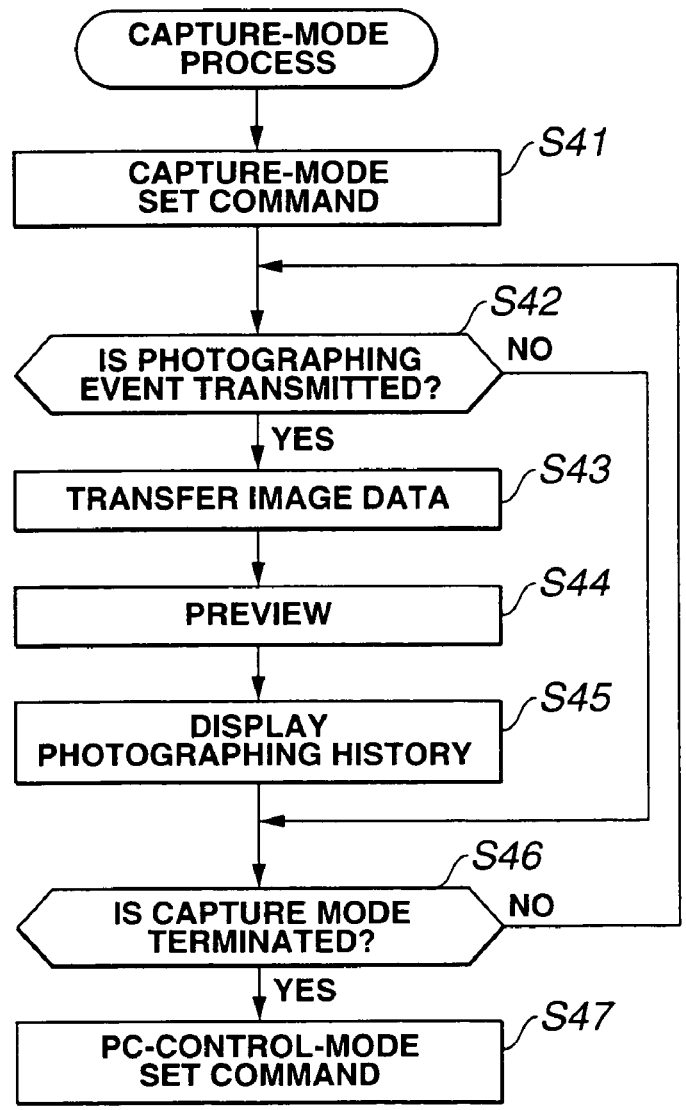

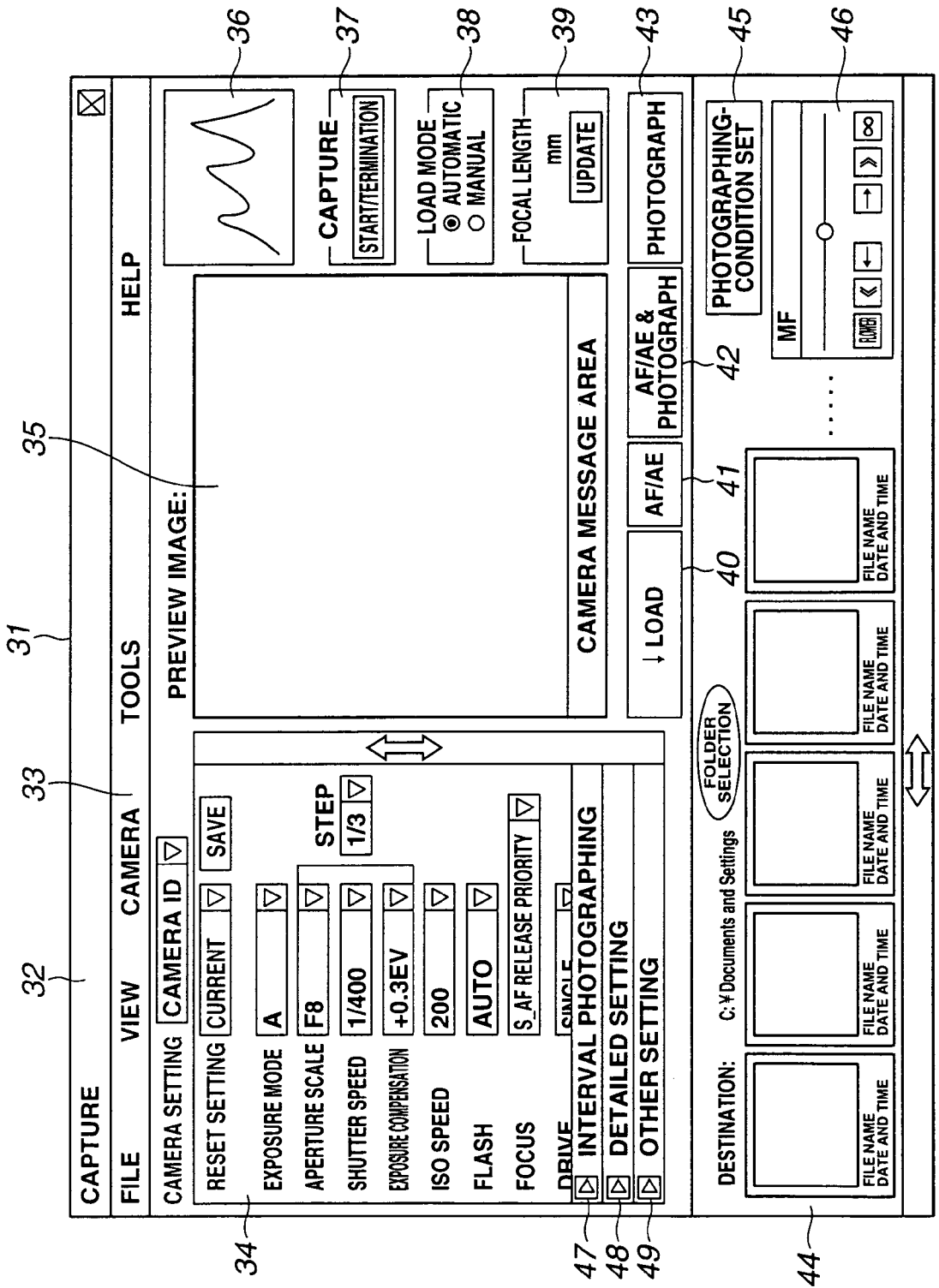

IMAGE PICKUP SYSTEM, CAMERA, EXTERNAL APPARATUS, IMAGE PICKUP PROGRAM, RECORDING MEDIUM, AND IMAGE PICKUP METHOD

CROSS REFERENCE TO RELATED APPLICATION(S)

This application claims benefit of Japanese Application No. 2003-000618 filed in Japan on Jan. 6, 2003, the contents of which are incorporated by this reference.

BACKGROUND OF THE INVENTION

1. Field of the Invention

The present invention relates to an image pickup system in which a camera communicates with an external apparatus to take a picture, the camera, the external apparatus, an image pickup program, a recording medium, and an image pickup method.

2. Description of Related Art

In cameras such as digital cameras and video cameras, besides a photographing mode in which exposure is automatically controlled, another photographing mode in which various settings can be manually performed has conventionally been proposed and been in practical use.

It is assumed that a user manually performs various settings of such a camera and photographs using the camera. When the user changes the settings for every scene to be taken, disadvantageously, the time necessary for the operation increases in proportion to the number of setting items to be changed. Moreover, in recent compact cameras, various operating members are miniaturized and functions thereof are shared. Accordingly, there is a drawback that the operability is not necessarily good.

In consideration of the above disadvantages, for example, Japanese Unexamined Patent Application Publication No. 2000-138860 discloses a technique whereby a camcorder is connected to a personal computer (PC) through a serial bus and the camcorder is operated on the side of the PC to set or change control data for the camcorder. According to this technique, a plurality of selectable control data items are set with respect to one control item, data items necessary to photograph are selected from the set control data items, and a camera included in the camcorder is controlled on the basis of the selected control data items.

According to the technique disclosed in Japanese Unexamined Patent Application Publication No. 2000-138860, the PC does not include means for selecting between the priority of the operation for setting various photographing conditions on the camera side and the priority of photographing conditions set on the PC side upon photographing. Thus, the flexibility of photographing is low. For example, it is assumed that photographing conditions of the camera are set on the PC side and the user then grasps the camera to photograph. If the user desires to slightly change the photographing conditions and then photograph, he or she must go to the PC and change the photographing conditions.

Further, according to the above technique, a plurality of control data items are set once. Disadvantageously, the user cannot confirm how each control data item contributed to the result of photographing. Accordingly, it takes much time to set the optimum photographing conditions. In addition, some experience is required for setting.

SUMMARY OF THE INVENTION

It is an object of the present invention to provide an image pickup system, a camera, an external apparatus, an image pickup program, a recording medium, and an image pickup method whereby complicated photographing conditions can be easily set and a picture can be taken with good operability.

In brief, the present invention relates to an image pickup system including an external apparatus and a camera. The external apparatus includes an external apparatus operator capable of setting at least a plurality of photographing conditions of the camera, and a display unit capable of displaying respective set states of the photographing conditions. The camera includes a camera operator capable of setting at least photographing conditions. The camera is capable of photographing based on the photographing conditions set through the camera operator or the photographing conditions received from the external apparatus, and transmitting image data obtained by photographing to the external apparatus. When a picture is taken based on the photographing conditions set through the external apparatus operator, each time one photographing condition is set by the external apparatus operation unit, the picture is taken through the camera based on the photographing conditions including the set photographing condition, image data obtained is transmitted from the camera to the external apparatus, and the image data is displayed by the display unit.

The above and other objects, features and advantages of the invention will become more clearly understood from the following description referring to the accompanying drawings.

BRIEF DESCRIPTION OF THE DRAWINGS

FIG. 3A is a flowchart showing a control process according to the embodiment, the control process being performed through the PC when photographing is performed in a second photographing mode in which the PC serves as a master;

FIG. 3B is a diagram showing the flow of commands and data between the camera and the PC in the process of FIG. 3A;

FIG. 4A is a flowchart showing another control process according to the embodiment, the control process being performed through the PC when photographing is performed in a first photographing mode in which the digital camera serves as the master;

FIG. 4B is a diagram showing the flow of commands and data between the camera and the PC in the process of FIG. 4A; and FIG. 5 is a diagram showing an operation screen as a capture window on a display device of the PC according to the embodiment.

DETAILED DESCRIPTION OF PREFERRED EMBODIMENT

An embodiment of the present invention will now be described hereinbelow with reference to the drawings.

Figure 1:
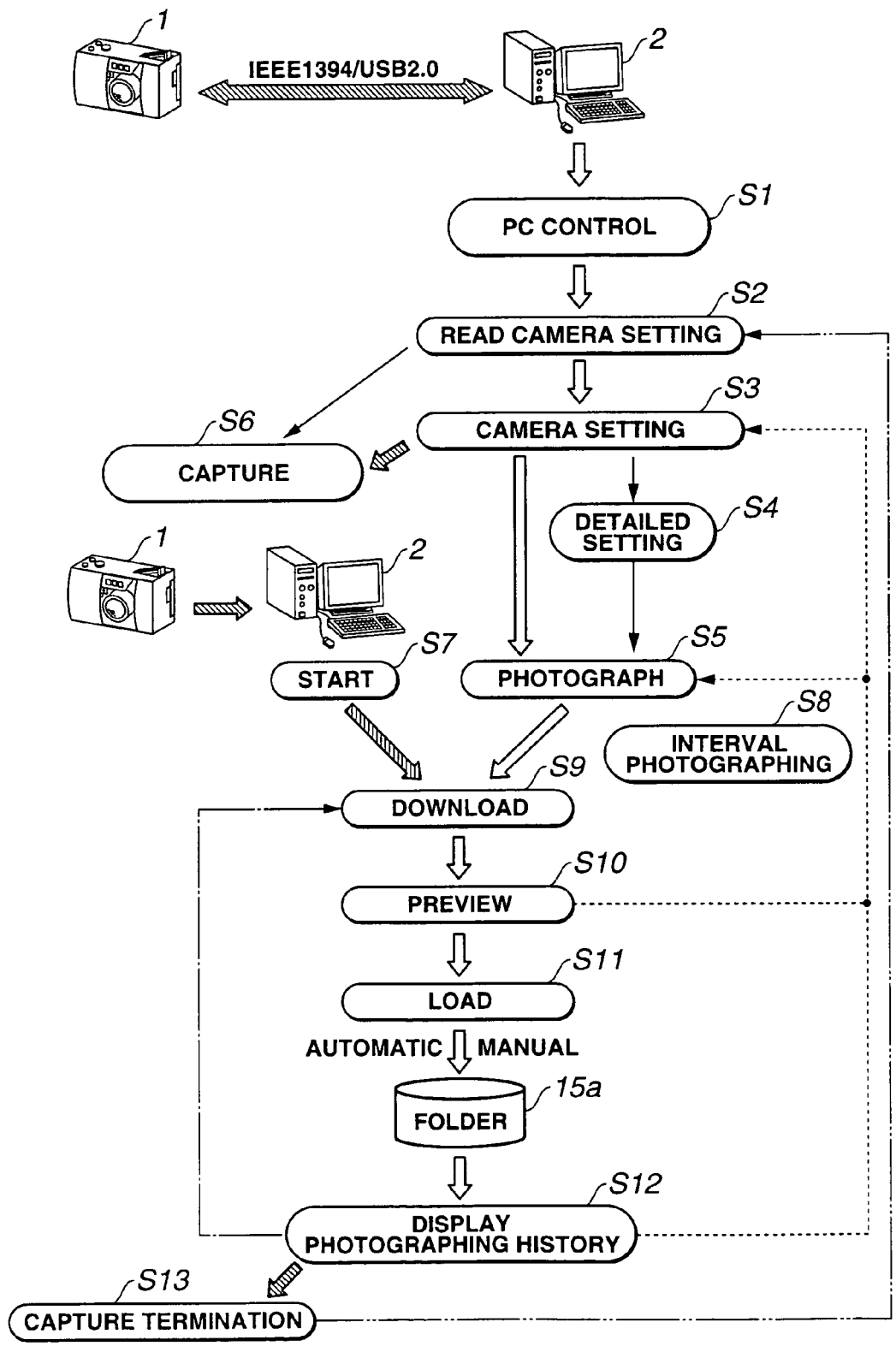
FIG. 1 is a state transition diagram showing a state transition in picture taking through a digital camera connected to a personal computer (PC) according to an embodiment of the present invention.

FIGS. 1 to 5 show the embodiment of the present invention. FIG. 1 is a state transition diagram showing a state transition in picture taking through a digital camera connected to a personal computer.

According to the present embodiment, a digital camera 1 is connected to a personal computer (PC) 2 serving as an external apparatus through a two-way communication line such as IEEE 1394 or USB 2.0, thus constituting an image pickup system.

In the image pickup system, the PC 2 runs an image pickup program and communicates with the digital camera 1, so that photographing in a second photographing mode, in which the PC 2 functions as a master to control the digital camera 1, and photographing in a first photographing mode, in which the digital camera 1 serves as the master, can be performed.

The state transition in the above-mentioned image pickup system will now be described with reference to FIG. 1.

At the start of the operation of the image pickup system, a photographing mode is set to the above-mentioned second photographing mode (PC control) in which the PC 2 controls the digital camera 1 in order to perform photography (S1).

Subsequently, the PC 2 reads various data items (photographing conditions) related to camera setting of the digital camera 1 (S2).

After that, the photographing conditions of the digital camera 1 are set from the PC 2 (S3). Alternatively, the photographing conditions of the digital camera 1 are set in more detail as necessary (S4). Then, a picture is taken under the control of the PC 2 (S5).

Alternatively, after the photographing conditions are read in S2 mentioned above, the system enters a capture mode (S6) without particularly changing the setting, or by selecting the first photographing mode such that the digital camera 1 is set to the master after the photographing conditions of the digital camera 1 are changed in S3 mentioned above. In the capture mode, at the start of photographing (S7), image data obtained by photographing is downloaded from the digital camera 1 to the PC 2 through the aforementioned communication line (S9).

The download is also performed after the photographing under the foregoing PC control in S5. Alternatively, when interval photographing (S8) based on preset photographing intervals or the preset number of photographs is performed, image data is similarly downloaded from the digital camera 1 to the PC 2.

Subsequently, an image file downloaded is previewed in the PC 2 (S10). After the preview, if the user desires to take the next picture without saving the image, the operation is returned to S5 mentioned above. If the user desires to change the setting of the digital camera 1 and again take a picture without saving the image, the operation is returned to S3 mentioned above.

On the other hand, after the preview in S10, if the user desires to save the image in the PC 2, a load process is performed (S11). In the load process, the image file, downloaded from the digital camera 1 and saved as a temporary file in the PC 2, is stored into a folder 15a (an automatically-set folder can be used or a manually-selected or created folder can also be used) in an auxiliary storage 15 (refer to FIG. 2) in the PC 2. The auxiliary storage 15 will be described later. The image file is stored with a file name (an automatically-set file name can be used or a manually-set file name can also be used).

After that, photographing history is displayed (S12). The photographing history includes a name of a destination folder, a path, and images in the folder. The images are displayed as thumbnail images. Further, if the user desires to take the next picture under the present photographing conditions, the operation is returned to S5 mentioned above. Alternatively, if the user desires to change the photographing conditions of the digital camera 1, the operation is returned to S3 mentioned above. When the next picture taken by the interval photographing in S8 is downloaded, the operation is returned to S9 mentioned above.

It is assumed that after the photographing history is displayed in S12 mentioned above, the capture mode (first photographing mode) is held at that time. If the user desires to terminate the capture mode, a termination process is performed (S13).

After the capture mode is terminated, the operation can be returned to S2 mentioned above. Under the control of the PC 2 in the second photographing mode, the photographing conditions of the digital camera 1 are again read and a picture is taken in the second photographing mode (PC control). Alternatively, the mode is again changed to the first photographing mode (capture mode) and a picture is taken in this mode.

Figure 2:
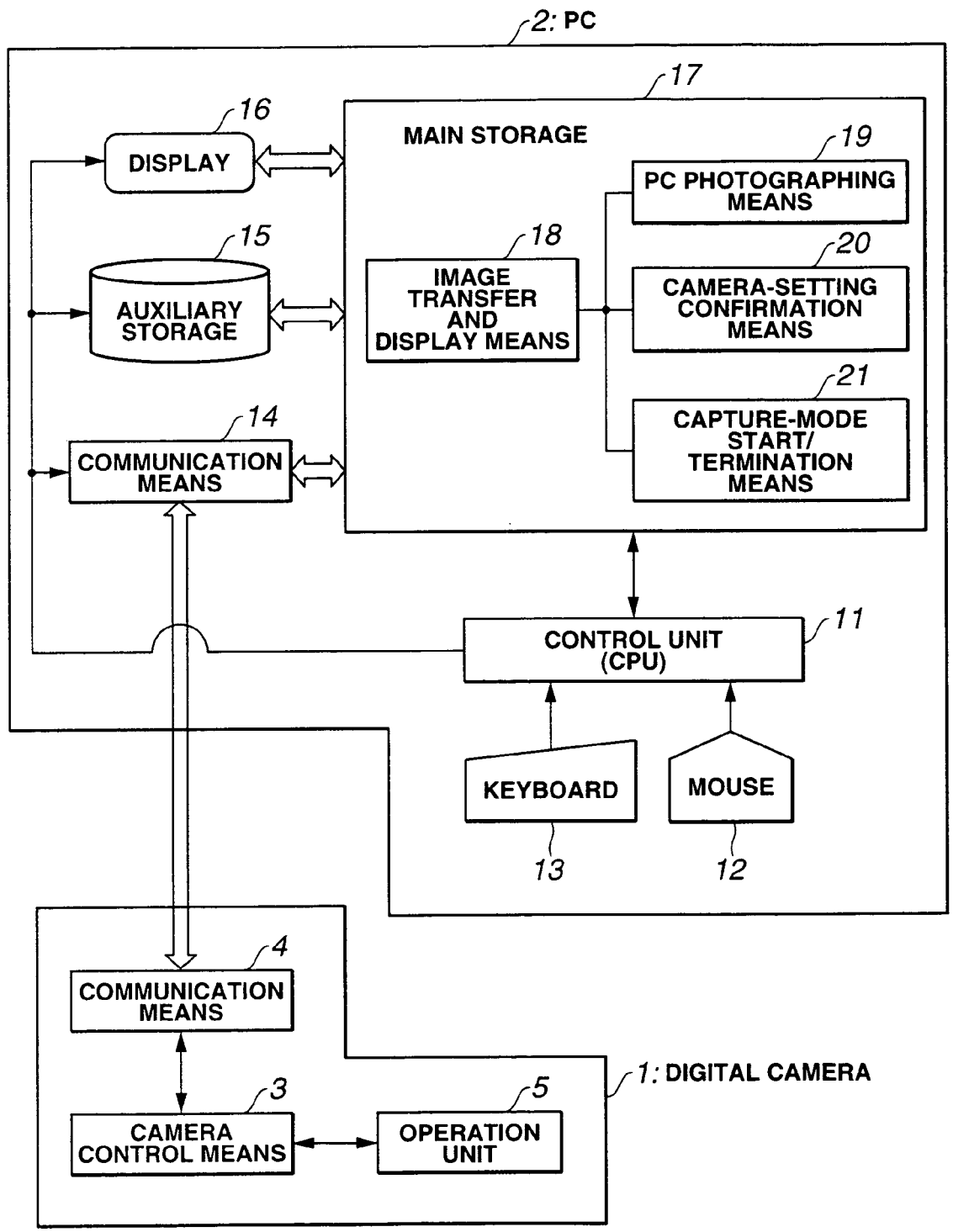
FIG. 2 is a block diagram schematically showing the structure of an image pickup system comprising the digital camera and the PC according to the embodiment.

FIG. 2 is a block diagram schematically showing the structure of the image pickup system comprising the digital camera 1 and the PC 2 which are connected to each other.

The PC 2 comprises: a control unit 11 functioning as control means comprising a CPU and the like; a mouse 12 serving as external apparatus operation means for pointing a position on a screen of a display 16, which will be described later, in order to perform the operation; a keyboard 13 serving as external apparatus operation means for entering characters; bidirectional communication means 14 for communicating with the digital camera 1, the means 14 comprising the IEEE 1394 or USB 2.0 mentioned above; the auxiliary storage 15 comprising a readable recording medium such as a hard disk and serving as storage means in which a hierarchical file system having folders is constructed, and an image pickup program and image data are stored; the display 16 functioning as display means for showing a display screen and other various information items according to the image pickup program in a visual form; and a main storage 17 comprising a RAM and the like and serving as storage means as a work area of the foregoing control unit 11.

In the main storage 17, an operating system for controlling the fundamental operation of the PC 2 and the image pickup program running on the operating system are loaded such that the system and the program can be executed. In addition, various data items such as image data are loaded such that each data is processed.

The above-mentioned image pickup program comprises: image transfer and display means 18 for downloading image data from the digital camera 1 through the communication means 14 and storing the data as a temporary file in the auxiliary storage 15, outputting the stored temporary file to the display 16 in order to display the data as a preview image, and recording the temporary file as an image file in a folder, which is automatically or manually set; PC photographing means 19 for controlling the digital camera 1 through the communication means 14 in order to photograph in the second photographing mode, in which the PC 2 is set to the master mode; camera-setting confirmation means 20 for reading the photographing conditions from the digital camera 1 and allowing the display 16 to display the photographing conditions in order to confirm the conditions; and capture-mode start/termination means 21 serving as selection means for transmitting a signal to the digital camera 1 through the communication means 14 in order to take a picture in the first photographing mode, in which the digital camera 1 serves as the master, or terminating the mode in which the digital camera 1 serves as a master and changing the mode to the second photographing mode.

The digital camera 1 comprises: communication means 4 functioning as camera communication means for bidirectionally communicating with the communication means 14 of the PC 2 to receive a control signal and transmit photographing conditions and image data; an operation unit 5 serving as camera operation means including a release button and a photographing-mode set button and the like; and camera control means 3 for controlling the image pickup operation and the like of an image pickup system (not shown) in response to an input supplied from the operation unit 5 and controlling the communication means 4 in order to perform various other controls related to the digital camera 1.

FIG. 3A is a flowchart showing the control through the PC 2 when a picture is taken in the second photographing mode in which the PC 2 serves as the master. FIG. 3B is a diagram showing flow of commands and data between the camera and the PC in the process of FIG. 3A.

At the start of the image pickup program, it is assumed that the digital camera 1 is connected to the PC 2 through the two-way communication line, the digital camera 1 is turned on, and the PC 2 is turned on under the control of the operating system.

When the image pickup program is activated to start the operation, the PC photographing means 19 sets the mode to the second photographing mode in which the PC 2 controls the digital camera 1 to photograph. The camera-setting confirmation means 20 instructs the digital camera 1 through the communication means 14 to transmit the photographing conditions set in the digital camera 1 (step S21).

The camera-setting confirmation means 20 reads setting data transmitted from the digital camera 1 in accordance with the instruction and allows the display 16 to display the data (step S22).

When necessary, the user changes the photographing conditions using the mouse 12 or the like on the display screen in the display 16. The camera-setting confirmation means 20 transmits the changed photographing conditions to the digital camera 1 (step S23).

In this instance, whether the photographing conditions are changed by the user is determined (step S24). If YES, the PC photographing means 19 allows the PC 2 to control the digital camera 1, so that a picture is automatically taken under the changed photographing conditions (step S25). Image data obtained by photographing is downloaded from the digital camera 1 to the PC 2 through the image transfer and display means 18 and the communication means 14 and is then stored as a temporary file into the auxiliary storage 15 (step S26). The image stored as the temporary file is displayed as a preview image in a preview-image display area 35 (refer to FIG. 5) in the display 16 through the image transfer and display means 18 (step S27). The preview-image display area 35 will be described later.

When step S27 is finished or it is determined in step S24 that the photographing conditions are not changed, whether a photograph command is given using a photograph button 43 (refer to FIG. 5) is determined (step S28). The photograph button 43 will be described later.

When the photograph command is given, the PC photographing means 19 allows the PC 2 to control the digital camera 1, thus photographing. Image data obtained by photographing is downloaded from the digital camera 1 into the PC 2 and the downloaded image data is stored as a temporary file in the auxiliary storage 15 (step S29).

The image stored as the temporary file is displayed as a preview image in the display 16 through the image transfer and display means 18 (step S30).

Subsequently, whether the user, who has confirmed the preview image, operates a load button 40 (refer to FIG. 5) is determined (step S31). The load button 40 will be described later. If YES, a file name is assigned to the temporary file. The named file is stored in the folder 15a which is set automatically or manually. After that, photographing history is stored and is displayed in the display 16. The photographing history includes the folder name of the folder 15a, in which the image has been stored, a path, and thumbnail images of image files stored in the folder 15a (step S32).

If photographing in the mode, in which the PC 2 serves as the master, is not instructed in step S28 mentioned above, whether a command for starting the capture mode is given through the capture-mode start/termination means 21 (a capture button 37, which will be described later, in FIG. 5) is determined (step S34).

In this instance, if the command for starting the capture mode is given, a capture-mode process is performed (step S35). The capture-mode process will be described later with reference to FIGS. 4A and 4B. After the capture-mode process, the control process is returned to step S22 mentioned above. Setting data of the digital camera 1 is read and is displayed in the display 16.

Whether an instruction to change the photographing conditions of the digital camera 1 is given is determined (step S33) in the following cases: First, the process of step S32 mentioned above is finished. Second, the load operation is not performed in step S31 mentioned above. Third, the start of the capture mode is not directed in step S34 mentioned above. If NO in step S33, the process is returned to step S28 mentioned above. The process is in standby mode until a photograph command is generated. If YES in step S33, the process is returned to step S23 mentioned above, for changing the photographing conditions.

FIG. 4A is a flowchart showing the control in the PC 2 when a picture is taken in the first photographing mode in which the digital camera 1 serves as the master. FIG. 4B is a diagram showing flow of commands and data between the camera and the PC when the process of FIG. 4A is performed.

When the process enters the capture-mode process in step S35 mentioned above, the process shown in FIG. 4A is executed.

When the process is started, first, the PC 2 itself is set to the first photographing mode and a capture-mode set command (camera master command) is transmitted from the PC 2 to the digital camera 1 in order to direct the digital camera 1 to serve as the master (step S41).

The process is in standby mode until a photographing event indicating that a picture has been taken is transmitted from the digital camera 1 (step S42).

When there is a photographing event, image data which is subsequently transferred from the digital camera 1 is received and is stored into the auxiliary storage 15 (step S43). The image is previewed through the display 16 (step S44), then displaying the photographing history (step S45).

If displaying the photographing history is finished, alternatively, if there is no photographing event in step S42 mentioned above, whether the termination of the capture mode is operated using the capture button 37 (refer to FIG. 5) is determined (step S46). If NO, the process is returned to step S42 mentioned above and the process is in standby mode until a photographing event is transferred.

If the termination of the capture mode is operated in step S46, the PC 2 itself is set to the second photographing mode and a PC-control-mode set command (PC master command) indicating that the PC 2 serves as the master to take a picture is transmitted from the PC 2 to the digital camera 1 (step S47), then the process is returned to the process shown in FIG. 3A.

FIG. 5 is a diagram showing an operation screen as a capture window in the display 16 of the PC 2.

An operation screen 31 as the capture window is displayed in the entire display area of the display 16. Alternatively, the screen 31 is displayed as one window in a part of the display area.

The operation screen 31 as the capture window includes: a title bar 32 where the name of the image pickup program and the like are displayed; a menu bar 33 where various operations related to the image pickup program are accessed using pull-down menu items; a camera setting area 34 where the photographing conditions of the digital camera 1 are displayed and which is used for setting; a preview-image display area 35 where an image downloaded from the digital camera 1 is displayed as a preview image; a histogram display area 36 where a brightness histogram generated on the basis of the image shown in the preview-image display area 35 is displayed; the capture button 37 serving as selection means for selecting between the start and the termination of the capture mode in which the digital camera 1 serves as the master; a load-mode setting box 38 used to set automatic or manual image load; a focal-length setting area 39 where the focal length of a lens in the digital camera 1 is shown, and when the digital camera 1 includes a zoom lens, the focal length may be changed; the load button 40 used to direct the start of the load operation for assigning a file name to the image and storing the image as a named file into the folder 15a; an AF/AE button 41 used to direct automatic focusing (AF) or automatic exposure (AE); an AF/AE & photograph button 42 used to allow the digital camera 1 to perform automatic focusing (AF) and automatic exposure (AE) and further to photograph; a photograph button 43 used to direct the photographing operation; a photographing-history display area 44 where the name of a destination folder, to which the image is stored, and a path are displayed so that the user can select them, and image files stored in the destination folder are displayed as thumbnail images; a photographing-condition set button 45 used to direct the digital camera 1 to reflect the photographing conditions of an active thumbnail image selected in the photographing-history display area 44; an MF window 46 which is displayed when manual focusing is set and which is used to adjust focusing through the operation of the PC 2; an interval-photographing bar 47 in which a photographing interval time and the number of photos are designated using a pull-down menu to set interval photographing, whereby photographing is automatically performed; a detailed-setting bar 48 where more detailed photographing conditions are set using a pull-down menu; and an other-setting bar 49 where another setting such as a camera ID, or date and time is performed using a pull-down menu. When the user points each operable displayed component among the above components with a pointer and then clicks, the component functions as external apparatus operation means.

The above-mentioned image pickup program is recorded in a computer-readable recording medium. When another computer reads and runs the program, the computer can similarly operate according to the program.

As mentioned above, the image pickup program is run on the general purpose PC connected to the digital camera, thus realizing the image pickup system. The invention is not limited to the above arrangement. A dedicated external apparatus, which realizes the same functions as those of a computer, that runs the image pickup program, by hardware, may be used.

According to the above embodiment, the photographing mode in which the digital camera serves as the master or the other photographing mode in which the PC serves as the master can be set on the side of the PC as the user desires. Accordingly, it is possible to take a picture in various situations: The user may operate the PC to remotely control the digital camera to photograph. The user as a main photographer may allow an assistant photographer to photograph with the digital camera while giving directions to the assistant photographer from the PC. The main photographer may photograph with the digital camera.

At the start of the image pickup program on the PC, the PC first reads the photographing conditions of the digital camera. Consequently, whether the setting is proper is checked, the setting may be changed as necessary, and after that, photographing can be started. Thus, the operability is improved.

Further, as for the change of the photographing conditions, each time one photographing condition item is changed, a picture is automatically taken on the basis of the update setting including the changed photographing condition and an obtained image is displayed as a preview image. Accordingly, what image is obtained according to the setting can be immediately grasped. Thus, the proper setting can be easily made in a short time.

Having described the preferred embodiment of the invention referring to the accompanying drawings, it should be understood that the present invention is not limited to those precise embodiments and various changes and modifications thereof may be made by one skilled in the art without departing from the spirit or scope of the invention as defined in the appended claims.

What is claimed is:

1. An image pickup system comprising:
   a camera; and
   an external apparatus, the camera and the external apparatus being connected to each other via a two-way communication line, wherein
   the camera comprises:
   a camera operator capable of setting a plurality of photographing conditions; and
   a camera communicator configured to enable the camera to photograph based on one of a photographing condition set through the camera operator and a photographing condition received from the external apparatus and transmitting image data obtained by photographing to the external apparatus, and
   the external apparatus comprising:
   an external apparatus operator capable of setting at least one photographing condition of the camera;
   a display unit capable of displaying a set state of the photographing condition;
   an external apparatus communicator configured to transmit the photographing condition to the camera and receive image data from the camera;
   a manually operable selector configured to select one of a first photographing mode in which the camera serves as a master to photograph and a second photographing mode in which the external apparatus serves as the master and controls the camera to photograph; and
   a controller configured to set the second photographing mode just after a start of camera control through the external apparatus, read photographing conditions set in the camera into the external apparatus, and, set the first or second photographing mode in accordance with manual operation of the selector;

wherein the external apparatus operator is capable of being configured to set a plurality of the photographing conditions of the camera, and when the controller sets the second photographing mode, each time one of said photographing conditions is set through the external apparatus operator, the controller automatically instructs the camera to photograph based on the photographing conditions including the set photographing condition, receive obtained image data, and control the display unit to display the image data.

2. A camera constructed so as to be connected to an external apparatus through a two-way communication line, the camera comprising:

a camera operator capable of setting a plurality of photographing conditions;

a camera communicator configured to allow the camera to photograph based on one of a photographing condition set by the camera operator and a photographing condition received from the external apparatus and transmitting image data obtained by photographing to the external apparatus, wherein just after the start of camera control through the external apparatus, when a selection of one of a first photographing mode, in which the camera serves as a master to photograph, and a second photographing mode, in which the external apparatus serves as a master and controls the camera to photograph, is manually performed under the control of the external apparatus to set the second photographing mode, photographing conditions set in the camera are transmitted to the external apparatus in response to a request sent from the external apparatus, and, a picture is taken in one of the first photographing mode and the second photographing mode under manual control of the external apparatus; and wherein the camera is capable of receiving a plurality of photographing conditions from the external apparatus, and in the second photographing mode, each time one of said photographing conditions is received from the external apparatus, a picture is automatically taken based on photographing conditions including the received photographing condition, and obtained image data is transmitted to the external apparatus.

* * * * *